Oct. 11, 1949.  E. C. WHITNEY ET AL  2,484,261
NEUTRALIZING WINDING FOR DYNAMOELECTRIC MACHINES
Filed Feb. 13. 1948
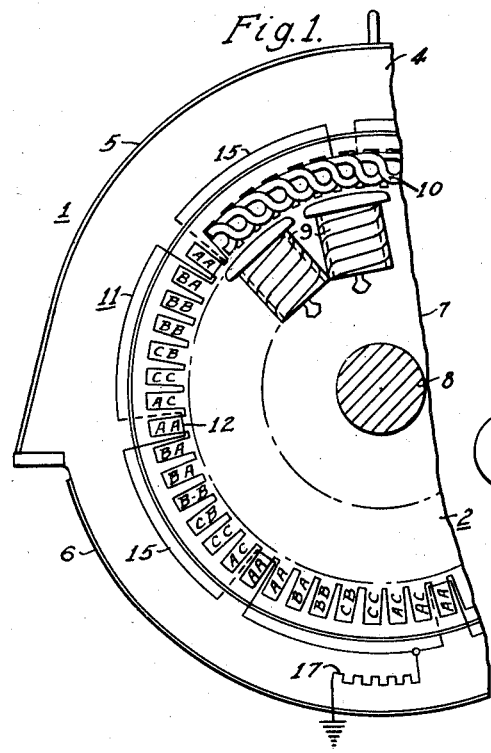
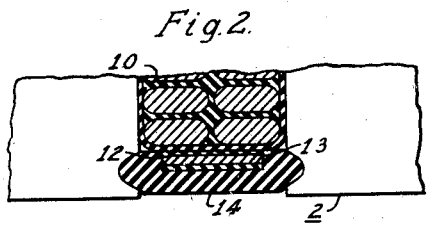
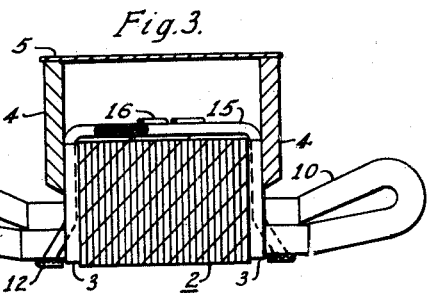
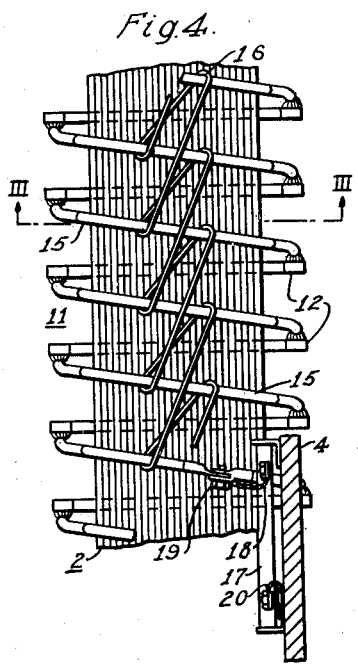
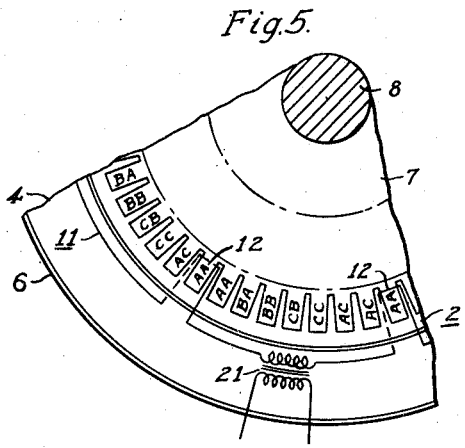
WITNESSES:
INVENTORS
Eugene C. Whitney
and Ralph Erhard.
BY
ATTORNEY __Patented Oct. 11, 1949__ 2,484,261

UNITED STATES PATENT OFFICE 2,484,261

NEUTRALIZING WINDING FOR DYNAMO-ELECTRIC MACHINES

Eugene C. Whitney and Ralph Erhard, Forest Hills, Pa., assignors to Westinghouse Electric Corporation, East Pittsburgh, Pa., a corporation of Pennsylvania Application February 13, 1948, Serial No. 8,038

12 Claims. (Cl. 171—252)

The present invention relates to the problem of induced shaft voltages in dynamo-electric machines and, more particularly, to a neutralizing winding for reducing, or substantially eliminating, such voltages.

In dynamo-electric machines of usual construction, there is a pulsating or varying magnetic flux extending circumferentially in the magnetic circuit of the stator or armature member which is caused by magnetomotive forces resulting from circumferential dissymmetries in the magnetic circuit of the stator. These dissymmetries are usually unavoidable, without excessive cost, and are the result of usual design practices and methods of construction, being caused by such factors as manufacturing variations, the use of segmental stator punchings or laminations, the presence of bolt or key slots in the punchings, the use of certain unsymmetrical tooth combinations per pair of poles, and numerous other factors. This circumferential flux links the shaft of the machine and induces an alternating voltage in the shaft, the effect being similar to a crude through-type current transformer with the shaft acting as a one-turn secondary. These shaft voltages cause circulating currents in the shaft and bearings, unless the bearings are insulated or the circuit otherwise broken, and are very objectionable in machines in which the bearings are difficult to insulate, or in which it is difficult to insulate the machine from a driving or driven machine connected to it.

The principal object of the present invention is to provide a dynamo-electric machine in which the induced shaft voltages are very much reduced, or may be substantially eliminated.

Another object of the invention is to provide a dynamo-electric machine having a neutralizing winding on the stator or armature member which reduces, or substantially eliminates, induced shaft voltages.

A further object of the invention is to provide a dynamo-electric machine having a closed neutralizing winding on the stator or armature member which is arranged to link the net pulsating circumferential flux so as to damp this flux and materially reduce it, with consequent reduction of the induced shaft voltage.

A still further object of the invention is to provide a dynamo-electric machine in which a closed neutralizing winding is placed on the stator member encircling the magnetic circuit of the stator so as to link the circumferential flux. The neutralizing winding is preferably arranged so as to be substantially non-inductive with respect to the main air-gap flux of the machine and the flux produced by the main stator winding currents, but since the neutralizing winding links the net pulsating circumferential flux, it tends to damp out this flux and thus reduces the induced shaft voltages. If desired, the neutralizing winding may be arranged so that an additional voltage is introduced into it of proper magnitude, frequency and phase angle to effect substantially complete damping of the circumferential flux, and thus to eliminate shaft voltages more completely than can be done by a short-circuited winding alone.

The invention will be more fully understood from the following detailed description, taken in connection with the accompanying drawing, in which:

Figure 1 is a partial end view of a machine embodying the invention, with the windings shown diagrammatically;

Fig. 2 is an enlarged, fragmentary, transverse sectional view showing a portion of one stator slot;

Fig. 3 is a longitudinal sectional view of one side of the stator member, the section being taken approximately on the line III—III of Fig. 4;

Fig. 4 is a view in elevation looking radially inward at the outside of the stator core and showing the neutralizing winding, but with the main stator winding omitted to avoid confusion, a portion of the frame being shown in section; and Fig. 5 is a fragmentary diagrammatic view similar to Fig. 1, showing a modified embodiment of the invention.

The invention is generally applicable to any type of dynamo-electric machine, and is shown in the drawing embodied in a synchronous motor or generator having a stator member 1 which includes a laminated stator core 2, of usual construction, held between finger plates 3. The stator core 2 is supported in a frame structure comprising frame rings 4 and top and bottom covers 5 and 6. The machine also has a rotor member 7 mounted on a shaft 8 and carrying a plurality of salient pole pieces 9. The stator core 2 is provided with longitudinal slots in its inner periphery in which a stator or armature winding 10 is disposed. The stator winding 10 may be of any desired type, either polyphase or single-phase, and is shown as a three-phase, two-layer winding with two coil-sides in each slot. The coil-sides of the different phases of the stator winding 10 are indicated diagrammatically in Fig. 1 by the letters A, B and C. It will be understood, of course, that although one particular winding arrangement has been shown, the invention is applicable to machines having any type of stator winding.

As previously explained, the unavoidable dissymmetries in the magnetic circuit of the stator member 1 cause magnetomotive forces which result in a varying or pulsating circumferential magnetic flux in the stator core 2, and this circumferential flux induces alternating voltages in the shaft 8 which cause undesirable circulating currents in the shaft and in the bearings of the machine. In accordance with the present invention, a neutralizing winding 11 is provided on the stator member 1 to damp the circumferential flux, and thus reduce, or eliminate, the induced shaft voltages.

In the preferred embodiment shown in the drawing, the neutralizing winding 11 includes a plurality of copper strap conductors 12 which are placed in the tops of certain of the slots of the stator core 2. As shown in Fig. 2, each conductor 12 is enclosed in an insulating cell 13 of fish paper, or similar insulating material, and is placed in a longitudinal groove in the inner side of the slot wedge 14. In this way, the conductor 12 can be placed in the top of the slot without taking up any of the space needed for the main stator winding 10, and the conductors can readily be inserted in the slots in which it is desired to place them by using grooved wedges in those slots. It will be understood, of course, that the conductors 12 might be placed in other locations in the slots, but in general they are most effective in the location shown, and are more easily put in place.

The conductors 12 are connected together in a closed winding by means of connectors 15, which may be pieces of insulated cable of suitable length. As clearly shown in Figs. 3 and 4, each connector 15 is soldered, or otherwise secured, to one end of a conductor 12 and is then carried up through a groove in the finger plate 3, across the back of the core 2, down through a groove in the finger plate 3 on the opposite side of the core, and is connected to the opposite end of the next adjacent conductor 12. The connectors 15 might be carried around the outside of the frame structure, if desired, instead of around the core only, but the arrangement shown is usually preferable because of its better appearance. After the connectors 15 are in place, they are lashed together with twine 16, in order to prevent vibration and movement of the connectors 15 with resulting wear and possible damage to the insulation.

It will be apparent that the conductors 12 and connectors 15 form a closed short-circuited winding extending helically around the stator core 2, so that the neutralizing winding 11 links the net circumferential flux in the core, as clearly shown in Fig. 4, in which the main stator winding 10 is omitted to avoid confusion, and in which the conductors 12 are shown somewhat closer together than their actual spacing. Preferably, the neutralizing winding 11 is grounded at one point through a resistor 17. The resistor 17 may be mounted on one of the frame rings 4, and one end of the resistor is connected by a cable 18 to a terminal device 19 inserted in one of the connectors 15. The other end of the resistor 17 is grounded to the frame 4 by means of a connector 20. The use of the grounding resistor 17 is not necessarily essential, but it is usually desirable in order to limit the static voltage to ground in the winding 11, so as to prevent it from becoming undesirably high, and to prevent excessive current flow in case a second point on the neutralizing winding should accidently become grounded.

The neutralizing winding 11 is arranged on the stator core 2 so as to be substantially non-inductive with respect to the main air-gap flux produced by the rotor 7, and also with respect to the magnetic flux produced by the currents in the stator winding 10, and in the amortisseur winding, if the machine is provided with one. In other words, the winding 11 is arranged so that the net, or resultant, voltage induced in it by these fields is substantially zero. In the particular embodiment shown in the drawing, this result is accomplished by disposing the conductors 12, as shown in Fig. 1, so that they are placed only in slots of the stator core which contain two coil-sides of the same phase of the main stator winding 10. With this arrangement, one conductor 12 lies in each pole group of one phase of the main winding, and, since all the conductors 12 are connected in the same direction, as shown in Fig. 4, the net voltages induced in the winding 11 by the air-gap flux, and by the flux due to the currents in the main winding 10, will be substantially zero. The same result might also be accompished by other arrangements of the conductors 12, such as by placing them only in slots which contain corresponding coil-sides of the same two phases in each pole group of the winding.

Since the neutralizing winding 11 is substantially non-inductive to the main air-gap fluxes of the machine, as explained above, there will be no net voltage induced in the winding by these fluxes. The winding 11 encircles the stator core 2, however, and links the net pulsating circumferential flux in the core which results from the magnetic dissymmetries of the core. This flux, therefore, induces a voltage in the winding 11 which causes currents to flow in the closed winding, and these currents produce a flux which opposes the flux causing them, thus tending to damp out the circumferential flux. The effect of the winding 11, therefore, is to provide a flux opposing the circumferential flux and substantially reducing its magnitude. The induced voltages in the shaft 8 are correspondingly reduced, and, in most cases, the provision of the winding 11 will reduce these voltages to such an extent that the resulting circulating currents in the shaft and bearings are small enough to be unobjectionable. If desired, a further reduction may be effected by providing an additional winding similar to the winding 11 placed in slots occupied by coil-sides of one of the other phases of the main stator winding 10. Such an additional winding is preferably not connected to the first winding, and will effect a further substantial decrease in the shaft voltage.

The magnetomotive force produced in the neutralizing winding 11 by the pulsating circumferential flux will always be somewhat less than the magnetomotive force which produces the circumferential flux, because of leakage fluxes around the winding. The damping effect of the short-circuited winding 11, as described, can never be complete, therefore, and some circumferential flux will remain, resulting in small induced voltages in the shaft 8, although these voltages will, of course, be very much reduced from what they would be without the neutralizing winding.

In some cases, it may be desirable, or necessary, to completely eliminate the shaft voltages, and this may readily be done by arranging the winding 11 so that an additional voltage is introduced into it of the proper frequency, magnitude and phase angle to effect complete neutralization, or damping, of the circumferential flux, so that the shaft voltage will be reduced to substantially zero. One way in which this may be done is to change the distribution of the conductors 12 around the core, or to introduce additional conductors 12, so that the winding is not completely non-inductive with respect to the air-gap flux. The winding 11 can readily be arranged in this way so that the main flux of the machine induces a voltage in it of proper magnitude and phase angle to obtain substantially complete neutralization of the circumferential flux.

Another means of effecting complete neutralization is shown in Fig. 5, which shows diagrammatically a portion of a neutralizing winding 11 identical to that of Fig. 1. In this modification, the desired additional voltage is introduced into the winding 11 by means of a transformer 21, which may be mounted on one of the frame rings 4. The secondary winding of the transformer 21 is connected in series in the winding 11, while its primary winding is excited from a suitable external source to provide a voltage in the winding 11 of suitable magnitude, frequency and phase angle for effecting complete neutralization of the circumferential flux.

It should now be apparent that a neutralizing winding has been provided for dynamo-electric machines which makes it possible to greatly reduce, or to substantially eliminate, undesirable circulating shaft and bearing currents. This winding is particularly desirable in motors or generators which are difficult to insulate from driving or driven machines to which they are connected, or in which it is difficult to insulate the bearings, although the invention is, of course, generally applicable to any type of dynamo-electric machine. Certain preferred embodiments of the invention have been shown and described for the purpose of illustration, but it is to be understood that the invention is not limited to these specific arrangements, and in its broadest aspects, it includes all equivalents, embodiments and modifications which come within the scope of the appended claims.

We claim as our invention:

1. A dynamo-electric machine having relatively rotatable armature and field members, a main winding on said armature member, and a closed neutralizing winding on the armature member, said neutralizing winding being disposed to encircle the magnetic circuit of the armature member and to link circumferential flux in the armature member, the neutralizing winding extending continuously in one direction and being distributed around the entire armature member.

2. A dynamo-electric machine having relatively rotatable armature and field members, a main winding on said armature member, and a closed neutralizing winding on the armature member, said neutralizing winding extending helically around the armature member so as to encircle the magnetic circuit of the armature member and to link circumferential flux in the armature member, the neutralizing winding extending continuously in one direction and being distributed around the entire armature member.

3. A dynamo-electric machine having relatively rotatable armature and field members, a main winding on said armature member, a closed neutralizing winding on the armature member, said neutralizing winding extending helically around the armature member so as to encircle the magnetic circuit of the armature member and to link circumferential flux in the armature member, and a resistor connected between one point of the neutralizing winding and ground.

4. A dynamo-electric machine having relatively rotatable armature and field members, a main winding on the armature member, and a short-circuited neutralizing winding on the armature member, said neutralizing winding encircling the magnetic circuit of the armature member and being disposed so as to be substantially non-inductive with respect to the magnetic fields of the field member and of the main armature winding.

5. A dynamo-electric machine having relatively rotatable armature and field members, a main winding on the armature member, and a short-circuited neutralizing winding on the armature member, said neutralizing winding extending helically around the magnetic circuit of the armature member to link circumferential flux in the armature member and being disposed so as to be substantially non-inductive with respect to the magnetic fields of the field member and of the main armature winding.

6. A dynamo-electric machine having relatively rotatable armature and field members, a main winding on the armature member, a short-circuited neutralizing winding on the armature member, said neutralizing winding extending helically around the magnetic circuit of the armature member to link circumferential flux in the armature member and being disposed so as to be substantially non-inductive with respect to the magnetic fields of the field member and of the main armature winding, and a resistor connected between one point of the neutralizing winding and ground.

7. A dynamo-electric machine having a stator member and a rotor member, said stator member including a slotted stator core, a main stator winding in the slots of the stator core, and a neutralizing winding, said neutralizing winding comprising a plurality of conductors disposed in slots of the stator core, and means for connecting said conductors together in a closed circuit extending around the core, said connecting means extending over the back of the core between adjacent conductors so that the neutralizing winding encircles the core and links circumferential flux therein.

8. A dynamo-electric machine having a stator member and a rotor member, said stator member including a slotted stator core, a main stator winding in the slots of the stator core, and a neutralizing winding, said neutralizing winding comprising a plurality of conductors disposed in slots of the stator core, and a plurality of connectors for connecting said conductors together in a closed circuit extending around the core, each of said connectors extending from one end of a conductor over the back of the core to the opposite end of an adjacent conductor so that the neutralizing winding encircles the core and links circumferential flux therein.

9. A dynamo-electric machine having a stator member and a rotor member, said stator member including a slotted stator core, a main stator winding in the slots of the stator core, and a neutralizing winding, said neutralizing winding comprising a plurality of conductors disposed in slots of the stator core, and means for connecting said conductors together in a closed circuit extending around the core, said connecting means extending over the back of the core between adjacent conductors so that the neutralizing winding encircles the core and links circumferential flux therein, and said conductors being arranged so that the neutralizing winding is substantially non-inductive with respect to the magnetic fields of the rotor member and of the main stator winding.

10. A dynamo-electric machine having a stator member and a rotor member, said stator member including a slotted stator core, a main polyphase stator winding comprising a plurality of coils disposed in the slots of the core with at least two coil-sides in each slot, and a neutralizing winding, said neutralizing winding comprising a plurality of conductors disposed in slots of the stator core, and means for connecting said conductors together in a closed circuit extending around the core, said connecting means extending over the back of the core between adjacent conductors so that the neutralizing winding encircles the core and links circumferential flux therein, the conductors of the neutralizing winding being disposed only in slots of the stator core which contain corresponding coil-sides in each pole group of the main winding so that the neutralizing winding is substantially non-inductive with respect to the magnetic fields of the rotor member and of the main stator winding.

11. A dynamo-electric machine having a stator member and a rotor member, a main winding on said stator member, and a closed neutralizing winding on the stator member, said neutralizing winding being disposed to encircle the magnetic circuit of the stator member and to link circumferential flux in the stator member, whereby a voltage is induced in the neutralizing winding for damping said circumferential flux, the neutralizing winding also including means for introducing therein an additional voltage of predetermined magnitude and phase.

12. A dynamo-electric machine having a stator member and a rotor member, said stator member including a slotted stator core, a main stator winding in the slots of the stator core, and a neutralizing winding, said neutralizing winding comprising a plurality of conductors disposed in slots of the stator core, and means for connecting said conductors together in a closed circuit extending around the core, said connecting means extending over the back of the core between adjacent conductors so that the neutralizing winding encircles the core and links circumferential flux therein, whereby a voltage is induced in the neutralizing winding for damping said circumferential flux, the neutralizing winding also including means for introducing therein an additional voltage of predetermined magnitude and phase.

EUGENE C. WHITNEY.
RALPH ERHARD.

REFERENCES CITED

The following references are of record in the file of this patent:

UNITED STATES PATENTS

| Number | Name | Date |
|---|---|---|
| 1,100,294 | Frick | June 16, 1914 |